US006674000B2

(12) United States Patent
Lambiaso

(10) Patent No.: US 6,674,000 B2
(45) Date of Patent: Jan. 6, 2004

(54) SIMPLIFIED INTERCONNECT FOR CENTER OF WIDE BODY AIRCRAFT

(75) Inventor: Guy Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 10/008,325

(22) Filed: Nov. 7, 2001

(65) Prior Publication Data

US 2003/0087550 A1 May 8, 2003

(51) Int. Cl.[7] .............................. H02G 3/22; H02B 1/01

(52) U.S. Cl. ........................... 174/50; 174/48; 174/135; 248/56; 248/65; 248/68.1; 439/544

(58) Field of Search .............................. 174/50, 48, 49, 174/54, 59, 57, 58, 53, 61, 63, 66, 67, 135; 220/3.2, 3.3, 3.4, 3.5, 3.8, 4.01, 4.02, 241, 242; 248/56, 560, 561, 563, 65, 68.1, 200, 225.11, 317; 439/544

(56) References Cited

U.S. PATENT DOCUMENTS 4,496,790 A * 1/1985 Spencer ........................ 174/48
4,721,476 A * 1/1988 Zeliff et al. .................... 174/48
4,863,399 A * 9/1989 Medlin, Jr. ................. 439/538
4,864,078 A * 9/1989 Bowman ...................... 174/48
5,012,042 A * 4/1991 Summach ................. 174/35 C
5,064,386 A * 11/1991 Dale et al. .................... 220/3.5
5,216,203 A * 6/1993 Gower ...................... 174/65 R
5,326,931 A * 7/1994 Cain et al. ..................... 174/48
5,354,953 A * 10/1994 Nattel et al. .................. 174/54
5,448,011 A * 9/1995 Laughlin ..................... 174/48
5,646,371 A * 7/1997 Fabian ......................... 174/58
5,752,682 A * 5/1998 Anderson .................. 248/68.1
6,102,229 A * 8/2000 Moncourtois ............... 220/3.3
6,162,071 A * 12/2000 Muller ........................ 174/48
6,274,809 B1 * 8/2001 Pudims et al. ................ 174/48
6,513,764 B2 * 2/2003 Koziol ...................... 248/68.1

* cited by examiner

*Primary Examiner*—Dean A. Reichard
*Assistant Examiner*—Angel R. Estrada
(74) *Attorney, Agent, or Firm*—Harness Dickey & Pierce P.L.C.

(57) ABSTRACT

An electrical cable interconnect device for use in an opening in a panel of an aircraft to interconnect cables on opposite sides of the panel. The interconnect device has a bracket having at least one peripheral edge that is configured and adapted to attach to the panel. A plate extends along a portion of the at least one peripheral edge of the bracket and through the opening in the panel. The plate has at least one opening that allows an electrical cable and/or a connector to be attached to the plate so that the plate facilitates interconnection of electrical cables on opposite sides of the panel. A cover can be disposed on top of the bracket so that the cover covers a portion of the opening in the panel. A gasket can be positioned between the bracket and the panel to seal the connection of the bracket to the panel.

23 Claims, 4 Drawing Sheets

SIMPLIFIED INTERCONNECT FOR CENTER OF WIDE BODY AIRCRAFT

FIELD OF THE INVENTION

The present invention relates to brackets that are used to hold electric cables, and more particularly, to brackets specifically adapted for use in an aircraft that enables electrical cables on opposite sides of a panel in the aircraft to be interconnected.

BACKGROUND OF THE INVENTION

Commercial passenger airlines typically have multiple rows of passenger seats that are arranged in columns separate by one or more aisles. There are occasions when it is necessary to run electrical cables to the passenger seats in order to provide the passengers access to various services, such as telecommunications, lighting, audio/sound, broadband communications, etc. On aircraft that have the passenger seats arranged into columns separated by single aisles, the wiring typically enters the passenger compartment through openings located along the passenger compartment walls. Larger wide body aircraft, however, typically have multiple columns of seats separated by multiple aisles. In such aircraft it is difficult to effectively route the cables from the walls of the passenger compartment to the passenger seats located near the center of the aircraft because of the intervening aisle. One alternative would be to route the wiring through the floor of the passenger compartment rather than the walls. Accordingly, it would be desirable to provide a convenient and secure means for routing the electrical wiring through the passenger compartment floor on those aircraft that have more than one aisle separating the passenger seats.

SUMMARY OF THE INVENTION

In accordance with the present invention, a preferred embodiment of an electrical cable interconnect device for use in an opening in a panel of an aircraft is disclosed. The interconnect device comprises a bracket having at least one peripheral edge. The at least one peripheral edge is configured and adapted to attach to a first surface of the panel adjacent the opening. A plate having opposite first and second ends is attached to the bracket. The first end of the plate is attached to and extends along a portion of the at least one peripheral edge of the bracket. The second end of the plate extends through the opening in the panel. The plate has at least one opening that is configured and adapted to allow an electrical cable to be attached to the plate so that the plate facilitates interconnection of electrical cables on opposite sides of the panel. The interconnect device may have a cover. The cover is disposed on top of the bracket so that the bracket is between the cover and the first surface of the panel. The cover covers a portion of the opening in the panel. Optionally, but preferably, a portion of an edge of the cover is offset to form an access opening through which the at least one electrical cable can be routed. The access opening allows the at least one electrical cable to pass through the access opening and through the opening in the panel.

Preferably, the at least one peripheral edge of the bracket is a plurality of peripheral edges that are connected to form a generally rectangular shaped frame with a central opening. The peripheral edges are configured and adapted to attach to the first surface of the panel with the central opening in the frame generally aligned with the opening in the panel. A gasket can be interposed between the at least one peripheral edge and the first surface of the panel.

The interconnect device can also include at least one connector. The at least one connector has first and second ends and is attached to the plate so that the at least one connector extends through the at least one opening with the first and second ends on opposite sides of the plate. The first end is configured and adapted to connect to an electrical cable on one side of the panel and the second end is configured and adapted to connect to an electrical cable on an opposite side of the panel so that the electrical cables on opposite sides of the panel can be conductively interconnected by the at least one connector.

Preferably, the at least one opening comprises at least one primary opening and a plurality of secondary openings. The at least one primary opening is configured and adapted to allow the at least one connector to extend through the at least one primary opening with the first and second ends of the least one connector being on opposite sides of the plate. The plurality of secondary openings are spaced about a periphery of the at least one primary opening and are configured and adapted to attach the at least one connector to the plate.

Even more preferably, the at least one connector is one of a plurality of connectors and the at least one primary opening is one of a plurality of primary openings. Each primary opening of the plurality of primary openings is configured and adapted to allow at least one connector of the plurality of connectors to extend through the primary opening with the first and second ends of the at least one connector of the plurality of connectors being on opposite sides of the plate. The plurality of secondary openings are spaced about a periphery of the plurality of primary openings and are configured and adapted to attach the plurality of connectors to the plate.

The present invention thereby provides an electrical cable interconnect device that can be used in an opening in a panel of an aircraft to interconnect electrical cables on opposite sides of the panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 6A–B are perspective views of two different types of connectors that can be used with the interconnect device of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
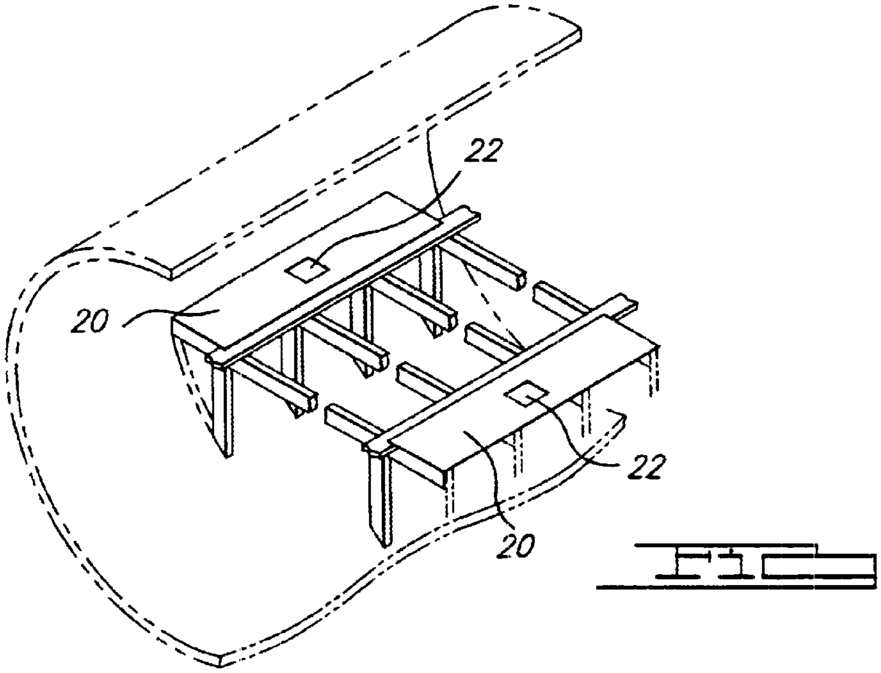
FIG. 1 is a perspective view of a portion of a passenger compartment floor panel within a fuselage of an aircraft, wherein the floor panel has multiple access openings.
Figure 7:
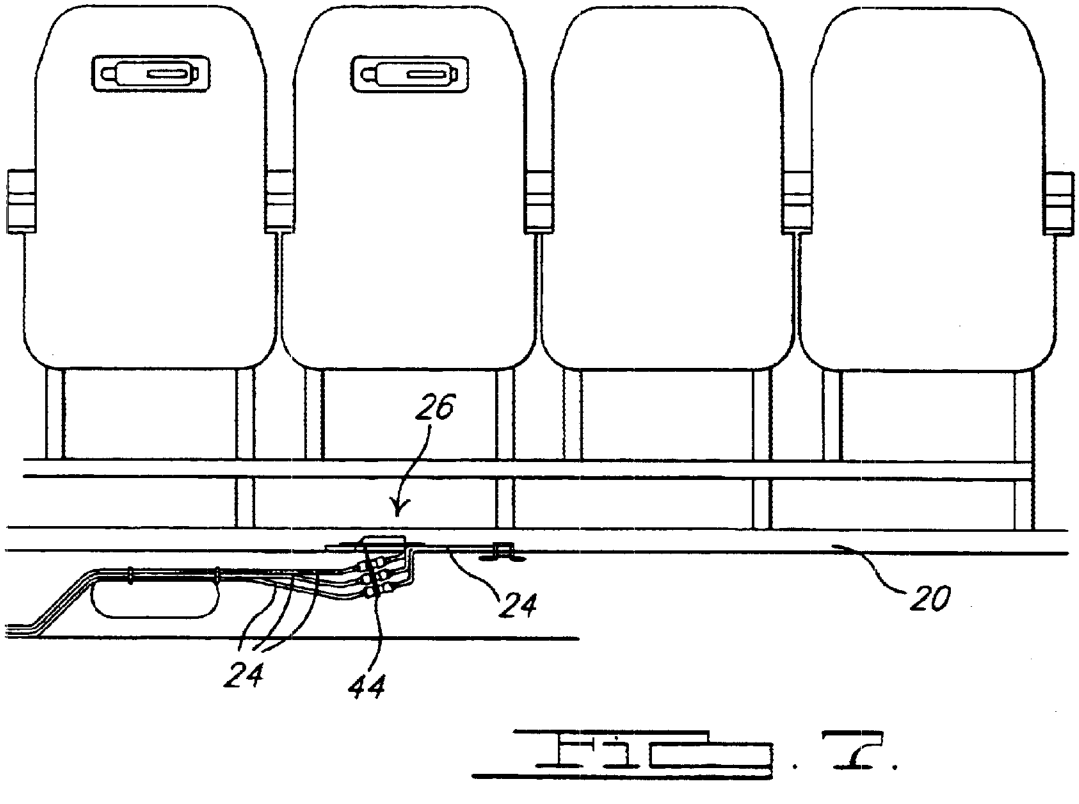
FIG. 7 is a side view of the interconnect device of FIG. 5 showing cables on opposite sides of the panel being interconnected by the interconnect device.

Referring to FIG. 1, there is shown a passenger compartment floor panel 20 having multiple openings 22 that are generally rectangular in shape. The openings 22 provide a means for routing cables 24, as shown in FIG. 7, through the floor panel 20 and into a passenger compartment of an aircraft. The number and the location of the openings 22 will vary depending on the requirements of the particular installation. While the opening 22 is shown and described as being rectangular in shape, it should be understood that other shapes are possible, and that the actual shape will depend in large part on the requirements of the particular installation. For example, the opening 22 could be circular and still be within the scope of the invention as defined by the claims.

Figure 2:
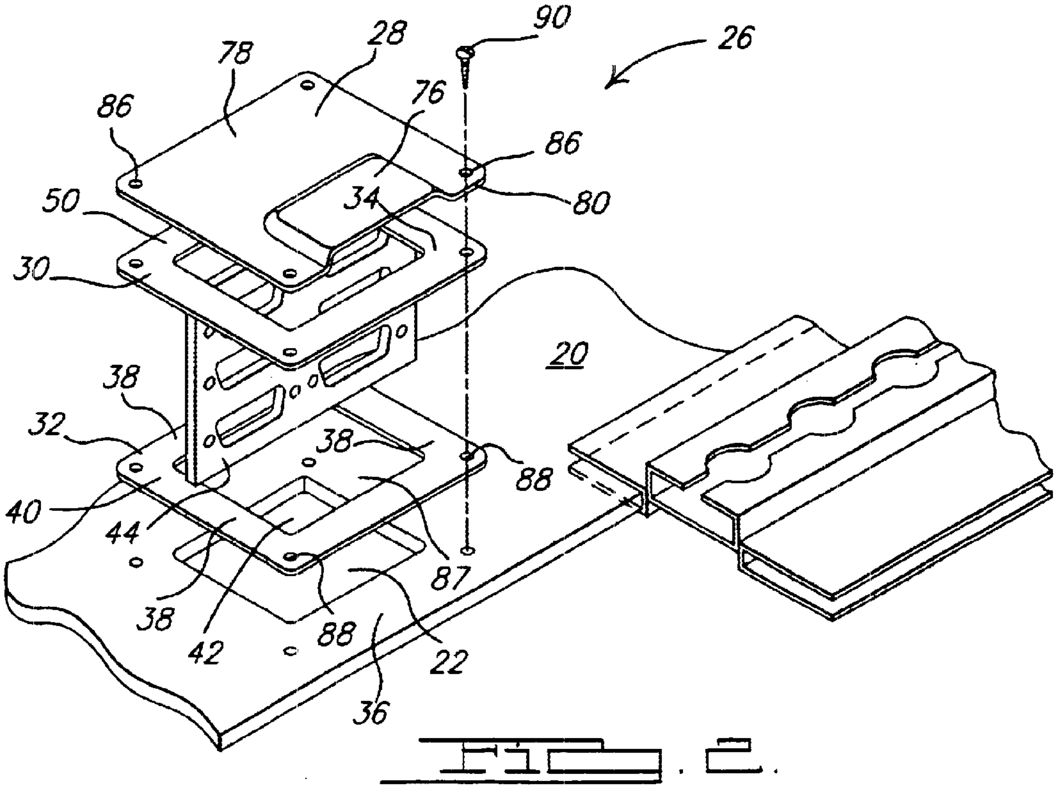
FIG. 2 is an exploded perspective view of an electrical cable interconnect device of the present invention.

Referring to FIG. 2, there is shown an electrical cable interconnect device, generally indicated as 26, in accordance with a preferred embodiment of the present invention. The interconnect device 26 provides a convenient and secure means for interconnecting electrical cables 24 below the floor panel 20 to electrical cables 24 in the passenger compartment above the floor panel 20. The interconnect device 26 has a cover 28, a bracket 30 and a gasket 32.

The bracket 30 has at least one peripheral edge 34 that is adapted and configured to attach to a top surface 36 of the floor panel 20. Preferably, the at least one peripheral edge 34 is one of a plurality of peripheral edges 38 that are arranged to form a frame 40 with a central opening 42. Preferably, the frame 40 is shaped to be complementary to the shape of the opening 22 in the floor panel 20. The bracket 30 has a plurality of mounting holes 43 to attach the bracket 30 to the floor panel 20. When the bracket 30 is attached to the floor panel 20, the central opening 42 in the bracket 30 is generally aligned with the opening 22 in the floor panel 20.

Figure 4:
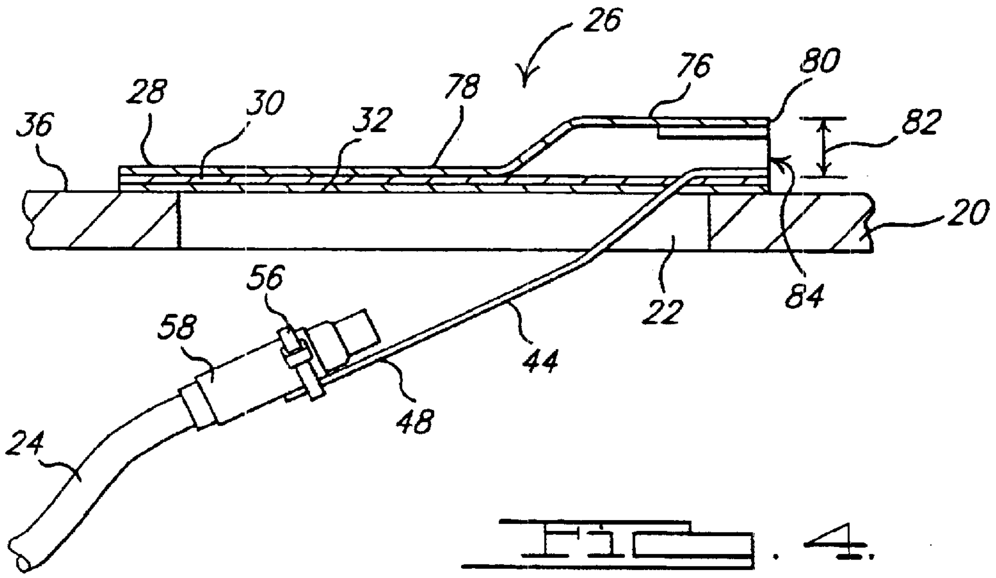
FIG. 4 is a side view of an interconnect device of the present invention installed in a panel of an aircraft and showing the use of a strap to attach a connector with an attached electrical cable to the plate.
Figure 5:
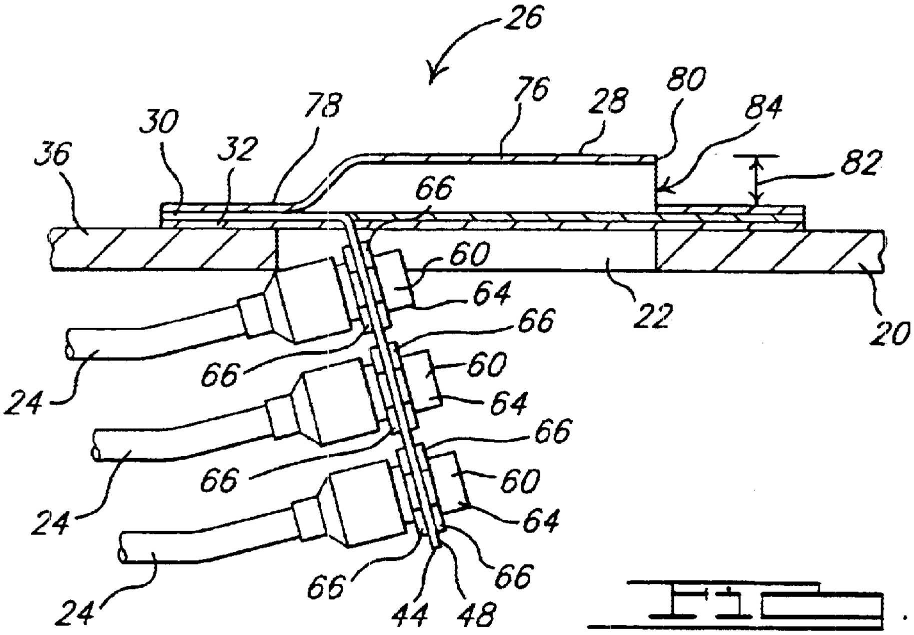
FIG. 5 is a side view of an interconnect device of the present invention installed in a panel of an aircraft with radial connectors being attached to the plate and electrical cables being attached to the connectors.
Figure 5A:
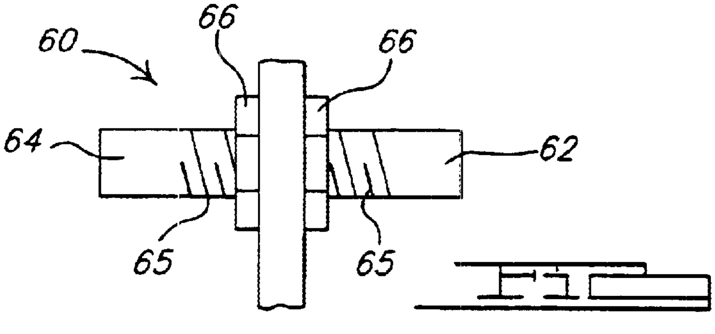

A plate 44 having opposite first and second ends 46, 48 extends from the bracket 30 through the opening 22 in the floor panel 20. The first end 46 of the plate 44 extends along a portion 50 of the at least one peripheral edge 34 and the second end 48 of the plate 44 extends through the opening 22 in the floor panel 20, as can be seen in FIGS. 4, 5, and 7. The plate 44 can be integral to the bracket 30, as shown in FIGS. 2, 5, and 7. That is, the plate 44 can be a part of the bracket 30 and made from a single piece of material. For example, the bracket 30 and the plate 44 can be stamped from a single piece of sheet metal. Alternatively, as shown in FIG. 4, the plate 44 can be a discrete component separate from the bracket 30 that is attached to the portion 50 of the at least one peripheral edge 34 by a variety of means. For example, the plate 44 can be attached to the portion 50 of the at least one peripheral edge 34 of the bracket 30 by rivets, screws, adhesives, and a variety of other means that will be apparent to those skilled in the art.

The plate 44 has at least one opening 52. The at least one opening 52 is configured and adapted to allow an electrical cable 24 to be attached to the plate 44 so that the plate 44 facilitates the interconnection of electrical cables 24 on opposite sides of the floor panel 20. Preferably, the at least one opening 52 is one of a plurality of openings 54 in the plate 44. The openings 54 in the plate 44, as can be seen in FIGS. 3A–D, can come in a variety of shapes and sizes depending upon the application in which the plate 44 is to be used and the desired method of attaching the cable 24 to the plate 44.

Figure 3A:
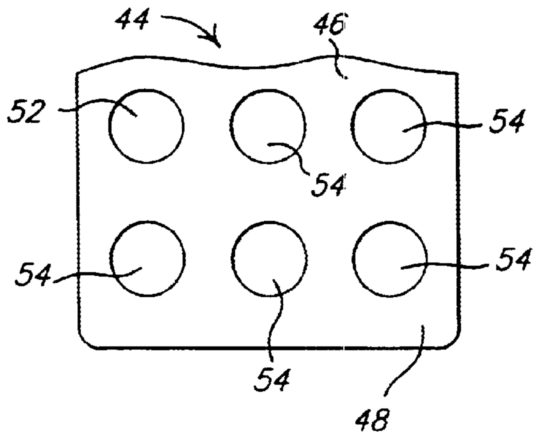
FIGS. 3A–E are partial views of various embodiments of the plate of the interconnect device of the present invention.

In a preferred embodiment, as shown in FIG. 4, a strap 56 is used to attach a cable 24 to the plate 44. The openings 54, as shown in FIG. 3E, are configured and adapted to receive the strap 56 to attach a cable 24 to the plate 44. The openings 54 can come in a variety of shapes, such as slots, to facilitate the use of a strap 56 to secure the cable 24 to the plate 44. The strap 56 can come in a variety of forms as will be apparent to those skilled in the art. For example the strap 56 could be a tie wrap that goes through the openings 54 in the plate 44 and secures the cable 24 to the plate 44. The strap 56 could be a metal wire or twist tie that secures the cable 24 to the plate 44. The strap 56 could also be an elastomeric band that retains the cable 24 against the plate 44. The strap 56 could also come in the form of a clip that fits into one or more openings 54 and secures the cable 24 to the plate 44. Therefore, the strap 56 can come in a variety of forms and still be within the scope of the invention as defined by the claims.

When the cable 24 is attached to the plate 44 with a strap 56, it is preferred that a protective member 58 be positioned between the cable 24 and the plate 44 and/or the strap 56 to protect the cable 24 from being damaged by the plate 44 and/or the strap 56. The protective member 58 can come in a variety of forms. For example, as can be seen in FIG. 4, the protective member 58 could be a sleeve in which the cable 24 is inserted so that the protective member 58 is in contact with the plate 44 and the strap 56. The protective member could also be in the form of a sheet or strip that is placed between the cable 24 and the plate 44 and/or the strap 56. Preferably, the protective member 58 is made from a phenolic material. However, it should be understood that the shape and form of the protective member 58 and the material out of which the protective member 58 is made can be varied, as will be apparent to those skilled in the art, without departing from the scope of the invention as defined by the claims.

In an alternate preferred embodiment, the cables 24 are attached to the plate 44 by means of a connector 60. The connector 60 has first and seconds 62, 64 that are configured and adapted to connect to electrical cables 24, as is known in the art. The at least one opening 52 in the plate 44 is configured and adapted to secure the connector 60 to the plate 44 with the first and second ends 62, 64 of the connector 60 being on opposite sides of the plate 44, as can be seen in FIG. 5. The connector 60 can come in a variety of forms, as will be apparent to those skilled in the art. For example, as can be in seen in FIG. 6A, the connector 60 can be a radial or barrel connector 60. When the connector 60 is a radial connector 60, the at least one opening 52 in the plate 44 is generally circular in shape, as can be seen in FIG. 3A. The radial connector 60, as shown in FIG. 5, extends through the at least one opening 52 in the plate 44 and has a cable 24 attached to the first end 62. The connector 60 can be secured to the plate 44 by a variety of means, as is known in the art. For example, the radial connector 60 can have a threaded portion 65 that extends through the at least one opening 52 in the plate 44 so that nuts 66 can be positioned on the radial connector 60 on opposite sides of the plate 44 and secure the radial connector 60 to the plate 44. The connector 60 can also be designed to be press fit or snapped into the at least one opening 52 in the plate 44. When the connector 60 is press fit or snapped into the at least one opening 52, the connector 60 preferably has tabs (not shown) that retain the connector 60 in the at least one opening 52 in the plate 44, as is known in the art. As can be seen in FIG. 7, the connector 60 conductively interconnects cables 24 above and below the floor panel 20. The attachment of the cable 24 and/or the connector 60 to the plate 44 minimizes the possibility of the interconnected cables 24 from becoming inadvertently disconnected. Preferably, the at least one opening 52 is one of a plurality of openings 54 so that more than one set of cables 24 can be interconnected, as shown in FIG. 7.

Figure 3B:
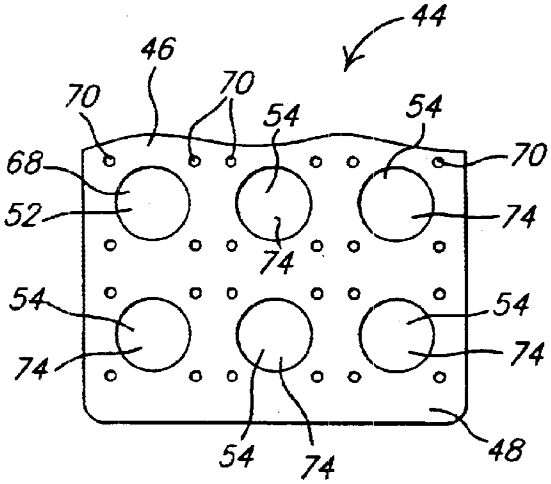
Figure 3C:
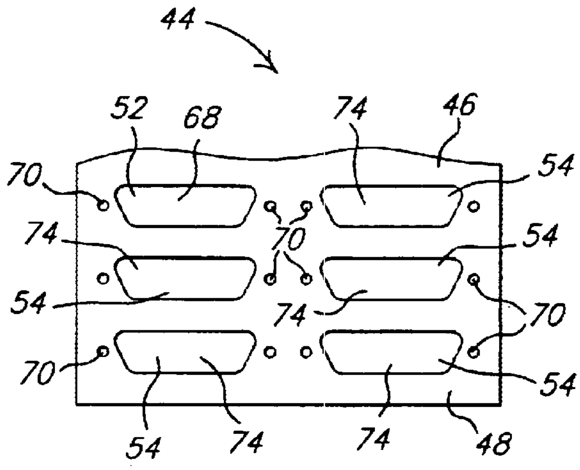
Figure 3D:
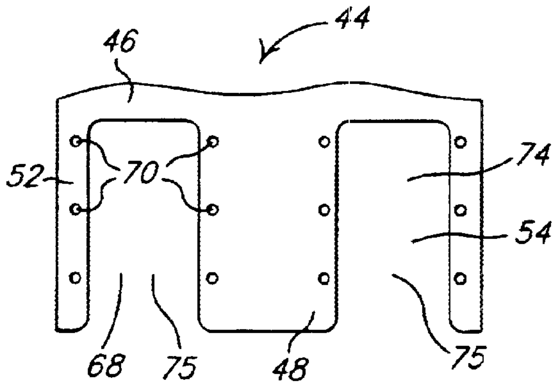
Figure 3E:
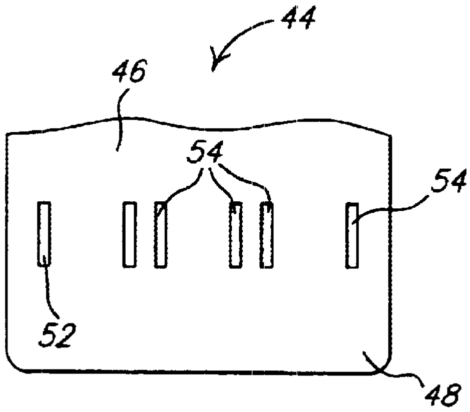
Figure 6B:
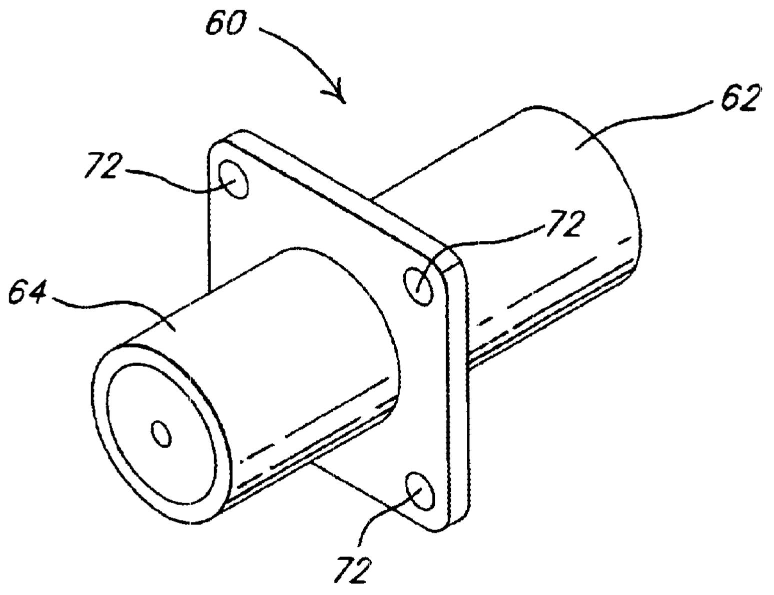

In another alternate preferred embodiment, as can be seen in FIGS. 3B–D, the at least one opening 52 in the plate 44 comprises at least one primary opening 68 and a plurality of secondary openings 70. The at least one primary opening 68 is configured and adapted to allow one or more connectors 60 to extend through the at least one primary opening 68 with the first and second ends 62, 64 of the connectors 60 being on opposite sides of the plate 44. The plurality of secondary openings 70 are spaced about a periphery of the at least one primary opening 68. The plurality of secondary openings 70 are configured and adapted to attach the connector(s) 60 to the plate 44. For example, when the connector 60, as shown in FIG. 6B, has a plurality of openings 72 spaced around a periphery of the connector 60, the connector 60 can be attached to the plate 44 by inserting the first or second end 62, 64 of the connector 60 through the at least one primary opening 68 and aligning the plurality of openings 72 in the connector 60 with the plurality of secondary openings 70 spaced about the periphery of the at least one primary opening 68. The alignment of the plurality of openings 72 in the connector 60 with the plurality of secondary openings 70 in the plate 44 allows the connector 60 to be attached to the plate 44 by means of mechanical fasteners (not shown), such as screws or rivets, or by other means, as are known in the art and as will be apparent to a skilled practitioner. Alternatively, the connector 60 could have a plurality of projections (not shown) that extend from the connector 60 in the locations where the plurality of openings 72 are located. The projections align with the plurality of secondary openings 70 when the connector 60 is inserted through the at least one primary opening 68. The projections are pressed into the plurality of secondary openings 70 on the plate 44 to secure the connector 60 to the plate 44, as will be apparent to those skilled in the art.

Preferably, the at least one primary opening 68 is one of a plurality of primary openings 74. Each primary opening 74 is configured and adapted to allow at least one connector 60 to extend through the primary opening 74 with the first and second ends 62, 64 of the connector 60 being on opposite sides of the plate 44. The shape and configuration of the primary openings 74 will depend upon the type of connector 60 that is going to be used to secure the cable 24 to the plate 44. For example, as shown in FIG. 3B, when the connector 60 is a radial or barrel connector 60, the primary openings 74 are circular. When the connector 60 is a D-subconnector, the primary openings 74 are generally trapezoidal in shape, as shown in FIG. 3C and as is known in the art. The primary openings 74 can be generally U-shaped openings 75, as shown in FIG. 3D. The U-shaped openings 75 are designed to accommodate more than one connector 60 in each of the U-shaped openings 75. The U-shaped openings 75 shown in FIG. 3D are configured and adapted to receive three D-subconnectors 60 in each of the U-shaped openings 75. Each of the primary openings 74 has a plurality of secondary openings 70 spaced about the periphery of the primary openings 74. As was discussed above, the secondary openings 70 are configured and adapted to attach the connector 60 to the plate 44.

Referring now to FIG. 2, the cover 28 is shaped to be complementary to the bracket 30 and the opening 22 in the floor panel 20. The cover 28 has a raised area 76 on the top surface 78 of the cover 28. The raised area 76 of the cover 28 is preferably along an edge 80 of the cover 28. The raised area 76 is offset from the top surface 78 a predetermined distance 82 and forms an access opening 84. The offset distance 82 is preferably only slightly larger than a maximum diameter of a cable 24 that will be routed through the access opening 84. The raised area 76 preferably extends away from the edge 80 a sufficient distance to allow the cables 24 to pass through the access opening 84 and be interconnected to cables 24 below the floor panel 20 without having to bend sharply. A width (not shown) of the access opening 84 created by the raised area 76 can vary depending upon the number of cables 24 being routed through the access opening 84. The cover 28 has a plurality of mounting holes 86 spaced along a periphery of the cover 28 for attaching the cover 28 to the floor panel 20. The mounting holes 86 in the cover 28 align with the mounting holes 43 in the bracket 30.

The gasket 32 is complementary to the peripheral edge 34 of the bracket 30 and to the opening 22 in the floor panel 20. The gasket 32 is positioned around a periphery of the opening 22 in the floor panel 20 and in immediate contact with the top surface 36 of the floor panel 20 with a central opening 87 in the gasket 32 being generally aligned with the opening 22 in the floor panel 20. The gasket 32 is preferably made of rubber, but other materials having similar functional sealing characteristics may also be used. The gasket 32 has mounting holes 88 along the perimeter which are provided for attaching the gasket 32 to the floor panel 20. The mounting holes 88 align with the mounting holes 43 in the bracket 30.

In using the interconnect device 26 to interconnect cables 24 on opposite sides of the floor panel 20, a cable 24 below the floor panel 20 and/or a connector 60 is attached to the plate 44 by any of the methods described above. A cable 24 above the opening 22 in the floor panel 20 is then interconnected to the cable 24 either by connecting to the connector 60 or to the cable 24 that is attached to the plate 44. The interconnecting of the cables 24 above and below the floor panel 20 are continued until all the cables 24 are interconnected. When interconnecting the cables 24, the cables 24 above the floor panel 20 are routed through the openings in the gasket 42 and in the bracket 30 so that the gasket 32 and the bracket 30 can be attached to the floor panel 20 without pinching any of the cables 24 and the cables 24 above the floor panel 20 pass through the access opening 84 when the cover 28 is attached. After all the cables are interconnected, the gasket 32, the bracket 30, the plate 44 (if a discrete part) and the cover 28 are aligned and attached to the top surface 36 of the floor panel 20. Preferably, the interconnect device 26 is connected to the top surface 36 of the floor panel 20 by screws 90 (for clarity only one screw is shown). However, it should be understood that other means of attaching the interconnect device 26 to the top surface 36 of the floor panel 20, as will be apparent to those skilled in the art, can be used without departing from the scope of the invention as defined by the claims.

The interconnect device 26 thereby provides a convenient and secure means for interconnecting cables 24 that are routed on opposite sides of the floor panel 20 in an aircraft. Furthermore, the interconnect device 26 can be readily adapted to accommodate various installations, thus eliminating or minimizing many of the problems associated with interconnecting cables that are routed on opposite sides of the floor panel 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrical cable interconnect device for use in an opening in a floor panel of an aircraft to interconnect electrical cables below the floor panel to electrical cables above the floor panel, the interconnect device comprising:

a bracket having a peripheral edge and a plate that extends along a portion of the peripheral edge, the peripheral edge defining an opening in the bracket and being configured and adapted to attach to a top surface of the floor panel adjacent the opening in the floor panel so that the opening in the bracket is generally aligned with the opening in the floor panel and the plate extends through the opening in the panel floor, the plate having at least one opening that is configured and adapted to allow an electrical cable to be attached to the plate;

a gasket disposed between the peripheral edge and the top surface of the floor panel; and a cover disposed on top of the peripheral edge so that the peripheral edge is between the cover and the gasket, the cover covering a portion of the opening in the bracket and a portion of the opening in the floor panel, and the cover having an offset portion that extends along a portion of an edge of the cover that is adjacent the plate, the offset portion forming an access opening that allows electrical cables to pass through the access opening, the bracket opening and the floor panel opening.

2. The interconnect device of claim 1, further comprising:

a strap, the strap being configured and adapted to pass through the at least one opening and secure an electrical cable to the plate.

3. The interconnect device of claim 2, further comprising:

a protective member, the protective member being disposed around the electrical cable and protecting the electrical cable from being damaged by the strap and the plate.

4. The interconnect device of claim 1, further comprising:

at least one connector having first and second ends, the at least one connector being attached to the plate and extending through the at least one opening so that the first and second ends are on opposite sides of the plate, the first end being configured and adapted to connect to an electrical cable below the floor panel and the second end being configured and adapted to connect to an electrical cable above the floor panel so that the electrical cables below and above the floor panel can be conductively interconnected by the at least one connector.

5. The interconnect device of claim 4, wherein:

the at least one opening comprises at least one primary opening and a plurality of secondary openings;

the at least one primary opening is configured and adapted to allow the at least one connector to extend through the at least one primary opening with the first and second ends of the at least one connector being on opposite sides of the plate; and the plurality of secondary openings are spaced about a periphery of the at least one primary opening and are configured and adapted to attach the at least one connector to the plate.

6. The interconnect device of claim 5, wherein:

the at least one connector is one of a plurality of connectors;

the at least one primary opening is one of a plurality of primary openings;

each primary opening of the plurality of primary openings is configured and adapted to allow at least one connector of the plurality of connectors to extend through the primary opening with the first and second ends of the at least one connector of the plurality of connectors being on opposite sides of the plate; and the plurality of secondary openings are spaced about a periphery of the plurality of primary openings and are configured and adapted to attach the plurality of connectors to the plate.

7. An electrical cable interconnect device for use in an opening in a panel of an aircraft, the interconnect device comprising:

a bracket having at least one peripheral edge, the at least one peripheral edge being configured attach to a first surface of the panel adjacent the opening; and a plate, the plate having opposite first and second ends, the first end being attached to and extending along a portion of the at least one peripheral edge, the second end extending through the opening in the panel, and the plate having at least one opening that allows an electrical cable to be attached to the plate so that the plate facilitates interconnection of electrical cables on opposite sides of the panel with at least one of the electrical cables remaining attached to the plate.

8. The interconnect device of claim 7, further comprising:

a cover, the cover being disposed on top of the bracket so that the bracket is between the cover and the first surface of the panel, and the cover covering a portion of the opening in the panel.

9. The interconnect device of claim 8, wherein:

a portion of an edge of the cover is offset to form an access opening through which at least one electrical cable can be routed, the access opening allowing the at least one electrical cable to pass through the access opening and through the opening in the panel.

10. The interconnect device of claim 7, wherein the at least one peripheral edge further comprises:

a plurality of peripheral edges that are connected to form a generally rectangular frame with a central opening, the peripheral edges being configured and adapted to attach to the first surface of the panel with the central opening in the frame generally aligned with the opening in the panel.

11. The interconnect device of claim 7, further comprising:

a gasket, the gasket being interposed between the at least one peripheral edge and the first surface of the panel.

12. The interconnect device of claim 7, wherein:

the plate and the bracket are a single piece.

13. The interconnect device of claim 7, further comprising:

a strap, the strap being configured and adapted to pass through the at least one opening and secure an electrical cable to the plate.

14. The interconnect device of claim 13, further comprising:

a protective member, the protective member being disposed around the electrical cable and protecting the electrical cable from being damaged by the strap and the plate.

15. The interconnect device of claim 7, further comprising:

at least one connector having first and second ends, the at least one connector being attached to the plate and extending through the at least one opening so that the first and second ends are on opposite sides of the plate, the first end being configured and adapted to connect to an electrical cable on one side of the panel and the second end being configured and adapted to connect to an electrical cable on an opposite side the panel so that the electrical cables on opposite sides of the panel can be conductively interconnected by the at least one connector.

16. The interconnect device of claim 15, wherein:

the at least one opening comprises at least one primary opening and a plurality of secondary openings;

the at least one primary opening is configured and adapted to allow the at least one connector to extend through the at least one primary opening with the first and second ends of the at least one connector being on opposite sides of the plate; and the plurality of secondary openings are spaced about a periphery of the at least one primary opening and are configured and adapted to attach the at least one connector to the plate.

17. The interconnect device of claim 16, wherein:

the at least one connector is one of a plurality of connectors;

the at least one primary opening is one of a plurality of primary openings;

each primary opening of the plurality of primary openings is configured and adapted to allow at least one connector of the plurality of connectors to extend through the primary opening with the first and second ends of the at least one connector of the plurality of connectors being on opposite sides of the plate; and the plurality of secondary openings are spaced about a periphery of the plurality of primary openings and are configured and adapted to attach the plurality of connectors to the plate.

18. The interconnect device of claim 17, wherein:

the plurality of primary openings are generally circular openings.

19. The interconnect device of claim 17, wherein:

the plurality of primary openings are generally D-sub connector openings.

20. The interconnect device of claim 17, wherein:

the plurality of primary openings are generally U-shaped openings.

21. An electrical cable interconnect device for use in an opening in a panel, the interconnect device comprising:

a first member operable to be attached to the panel, a second member attached to said first member and extending to one side of the panel;

at least one opening in said second member operable to secure an electrical cable to said second member; and a cover extending over at least a portion of the opening in the panel, said cover having a peripheral edge, said cover having an offset portion that extends along a portion of said edge, and said offset portion forming an access opening that allows an electrical cable to pass through said access opening and through the opening in the panel.

22. The interconnect device of claim 21, wherein said first and second members are a single integral member.

23. The interconnect device of claim 21, further comprising at least one connector having first and second ends, said connector being attached to said second member and extending through said opening in said second member with said first and second ends being on opposite sides of said opening in said second member, said connector being operable to secure said electrical cable to said second member, and said first and second ends being operable to conductively connect an electrical cable on one side of the panel to an electrical cable on the other side of the panel.

* * * * *